(12) United States Patent  
Dhong et al.

(10) Patent No.: US 8,229,989 B2
(45) Date of Patent: *Jul. 24, 2012

(54) METHOD FOR CONTROLLING ROUNDING MODES IN SINGLE INSTRUCTION MULTIPLE DATA (SIMD) FLOATING-POINT UNITS

(75) Inventors: Sang Hoo Dhong, Austin, TX (US); Harm Peter Hofstee, Austin, TX (US); Christian Jacobi, Boeblingen (DE); Silvia Melitta Mueller, Altdorf (DE); Hwa-Joon Oh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 971 days.

This patent is subject to a terminal disclaimer.

(21) Appl. No.: 12/238,500

(22) Filed: Sep. 26, 2008

(65) Prior Publication Data

US 2009/0024684 A1    Jan. 22, 2009

Related U.S. Application Data

(63) Continuation of application No. 10/982,110, filed on Nov. 5, 2004, now Pat. No. 7,447,725.

(51) Int. Cl.
    *G06F 7/38* (2006.01)

(52) U.S. Cl. ........................................ 708/496; 708/497
(58) Field of Classification Search ............... 708/496, 708/497, 550, 551
See application file for complete search history.

(56) References Cited

U.S. PATENT DOCUMENTS

| 7,447,725 B2 * | 11/2008 | Dhong et al. ............... 708/496 |
| 2003/0023646 A1 * | 1/2003 | Lin et al. ..................... 708/209 |
| 2003/0167460 A1 * | 9/2003 | Desai et al. .................. 717/151 |
| 2004/0034760 A1 * | 2/2004 | Paver et al. .................. 712/221 |
| 2005/0144212 A1 * | 6/2005 | Simkins et al. .............. 708/490 |

* cited by examiner

*Primary Examiner* — Chuong D Ngo
(74) *Attorney, Agent, or Firm* — Yudell Isidore Ng Russell PLLC

(57) ABSTRACT

A method for controlling rounding modes in a single instruction multiple data (SIMD) floating-point unit is disclosed. The SIMD floating-point unit includes a floating-point status-and-control register (FPSCR) having a first rounding mode bit field and a second rounding mode bit field. The SIMD floating-point unit also includes means for generating a first slice and a second slice. During a floating-point operation, the SIMD floating-point unit concurrently performs a first rounding operation on the first slice and a second rounding operation on the second slice according to a bit in the first rounding mode bit field and a bit in the second rounding mode bit field within the FPSCR, respectively.

4 Claims, 2 Drawing Sheets

METHOD FOR CONTROLLING ROUNDING MODES IN SINGLE INSTRUCTION MULTIPLE DATA (SIMD) FLOATING-POINT UNITS

PRIORITY CLAIM

The present application is a continuation of U.S. patent application Ser. No. 10/982,110, filed on Nov. 5, 2004, Now U.S. Pat. No. 7,447,725, which is incorporated herein by reference.

BACKGROUND OF THE INVENTION

1. Technical Field

The present invention relates to data processing in general, and, in particular, to a method for controlling rounding modes. Still more particularly, the present invention relates to a method for controlling rounding modes in single instruction multiple data (SIMD) floating-point units.

2. Description of Related Art

Generally speaking, a rounding mode is used to control the rounding of floating-point numbers during a floating-point operation within a floating-point data processing system. During the course of a scientific computation, the rounding mode tends to be switched very often. However, the frequent switching of the rounding mode creates a significant problem that can be attributed to a drawback of common processor designs. That is, every time when a processor switches its rounding mode, the processor has to flush its internal pipelines. Thus, the processor suffers a severe performance penalty whenever the processor is required to switch its rounding mode.

Many mathematical or scientific computations require the rounding mode to be switched on a frequent basis. For example, rounding mode switching occurs repeatedly in interval arithmetic when the same computations are performed twice, once with a round-up mode and the other with a round-down mode. The result of the interval arithmetic is an interval [a,b] where the infinitely precise result of the computation problem (which cannot be precisely computed) is guaranteed to lie within that interval. Thus, in order for a processor to perform the same computations according to the two different rounding modes, the processor has to change its rounding mode frequently.

Consequently, it would be desirable to provide an improved apparatus for controlling rounding modes such that the above-mentioned problem can be alleviated.

SUMMARY OF THE INVENTION

In accordance with a preferred embodiment of the present invention, a single instruction multiple data (SIMD) floating-point unit includes a floating-point status-and-control register (FPSCR) having a first rounding mode bit field and a second rounding mode bit field. The SIMD floating-point unit also includes a first slice and a second slice. During a floating-point operation, the SIMD floating-point unit concurrently performs a first rounding operation on the first slice and a second rounding operation on the second slice according to a bit in the first rounding mode bit field and a bit in the second rounding mode bit field within the FPSCR, respectively.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention is illustrated using a single instruction multiple data (SIMD) floating-point unit because complex mathematical computations are often performed on SIMD data processing systems that can perform operations on vectors of operands. The present disclosure describes some architectural features to support separately controllable rounding modes for each SIMD slice within a SIMD floating-point unit.

Typically, the rounding mode for a floating-point unit is stored in a special purpose register. For example, the rounding mode for a SIMD floating-point unit is stored in a floating-point status-and-control register (FPSCR).

Figure 1:
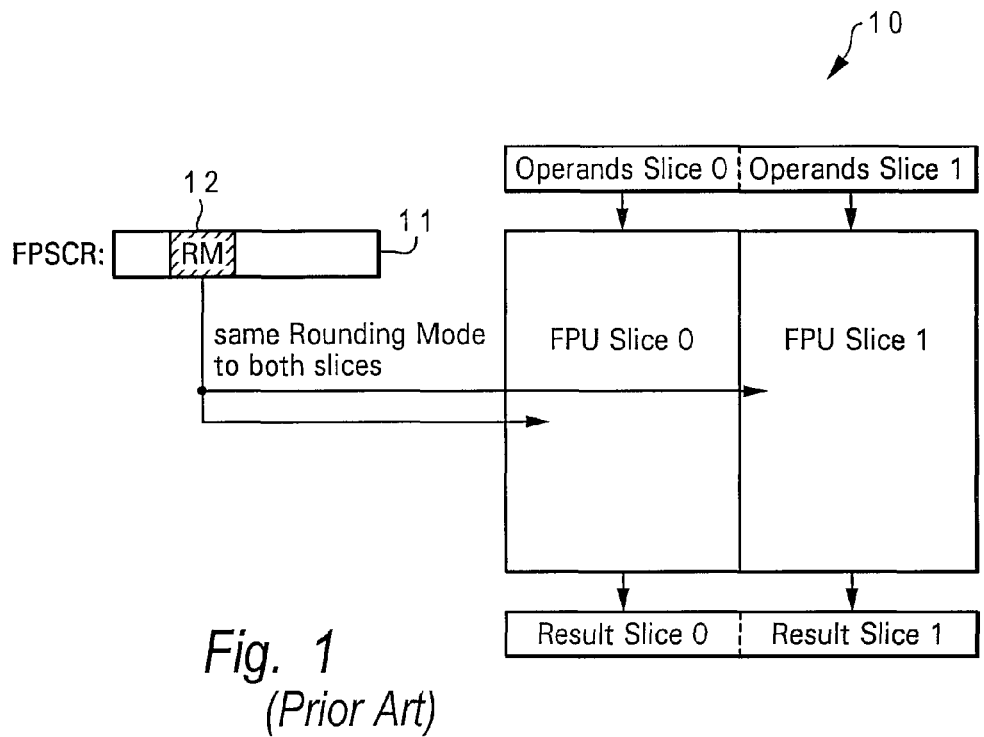
FIG. 1 is a block diagram of an apparatus for controlling the rounding modes of a SIMD floating-point unit, according to the prior art.

Referring now to the drawings and in particular to FIG. 1, there is illustrated a block diagram of an apparatus for controlling the rounding modes of a SIMD floating-point unit 10, according to the prior art. As shown, SIMD floating-point unit 10 includes two slices, namely, a floating-point unit slice 0 and a floating-point unit slice 1. Operands slice 0 are fed to slice 0 of floating-point unit 10 to produce a result slice 0. In concurrence, operands slice 1 are fed to slice 1 of floating-point unit 10 to produce a result slice 1. A FPSCR 11 has a rounding mode bit field 12 for controlling the rounding mode of SIMD floating-point unit 10. The floating-point operations in both floating-point unit slice 0 and floating-point unit slice 1 are controlled by a rounding mode bit stored in rounding mode bit field 12 within FPSCR 11.

Many processors support SIMD floating-point units, such as SIMD floating-point unit 10, to perform complex mathematical computations in a very efficient manner. However, because there is only one rounding mode stored in a rounding mode bit field 12 of FPSCR 11, all slices within SIMD floating-point unit 10 must perform their floating-point operations according to the same rounding mode. As mentioned above, the changing of the rounding mode via a writing to FPSCR 11 can cause a pipeline flush to occur within SIMD floating-point unit 10. The pipeline flush inside SIMD floating-point unit 10 is necessary because SIMD floating-point unit 10 does not support an instruction-dependency check for FPSCR 11. The frequent changing of rounding mode often hampers the performance of SIMD floating-point unit 10.

In accordance with a preferred embodiment of the present invention, separate rounding-mode fields are inserted in a FPSCR of a SIMD floating-point unit to accommodate a separate rounding mode for each floating-point unit slice within the SIMD floating-point unit. This enables concurrent computations of multiple operations on different rounding modes.

For example, when performing interval arithmetic, the SIMD floating-point unit can set one floating-point unit slice to perform a round-up operation and another floating-point unit slice to perform a round-down operation. Then, two floating-point operations can be performed concurrently, with one floating-point unit slice performing in a round-up mode and the other floating-point unit slice performing in a round-down mode. As such, the SIMD floating-point unit can perform interval arithmetic without switching the rounding-mode between the operations. This can save most updates to the rounding-mode fields in the FPSCR, which in turn prevents most pipeline flushes related to FPSCR updates. As a result, a much improved computational performance can be achieved.

Figure 2:
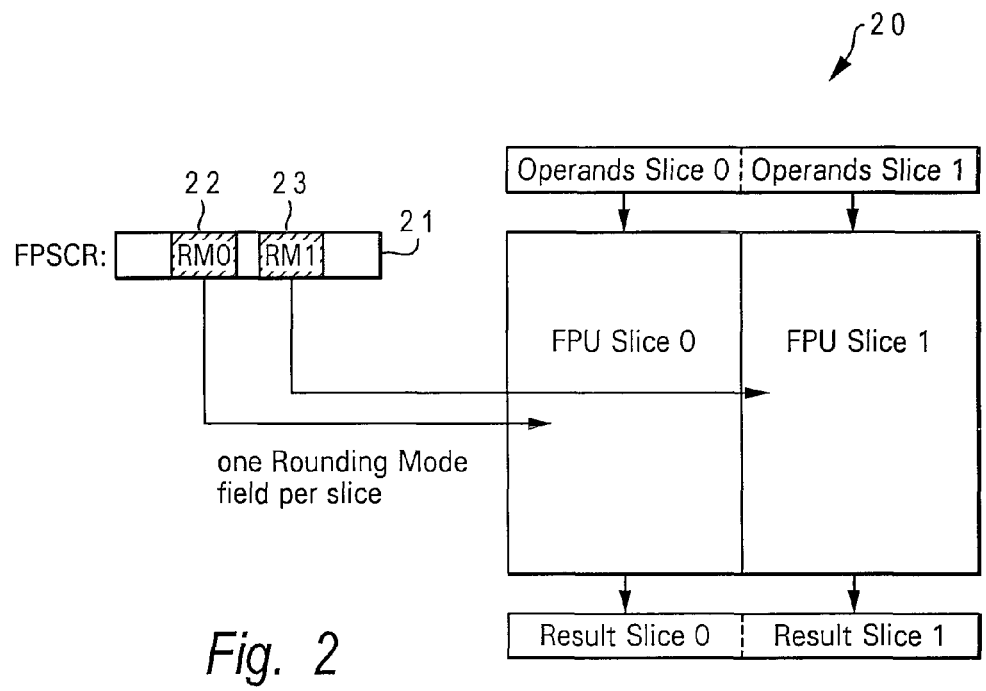
FIG. 2 is a block diagram of an apparatus for controlling the rounding modes of a SIMD floating-point unit, in accordance with a preferred embodiment of the present invention.

With reference now to FIG. 2, there is depicted a block diagram of an apparatus for controlling rounding modes for a SIMD floating-point unit, in accordance with a preferred embodiment of the present invention. As shown, a SIMD floating-point unit 20 includes two slices, namely, a floating-point unit slice 0 and a floating-point unit slice 1. Operands slice 0 are fed to slice 0 to produce a result slice 0, and in concurrence, operands slice 1 are fed to slice 1 to produce a result slice 1.

SIMD floating-point unit 20 also includes a FPSCR 21 to control the rounding modes of SIMD floating-point unit 20. FPSCR 21 includes a rounding mode bit field 22 and a rounding mode bit field 23. In the present embodiment, the floating-point operation in floating-point unit slice 0 is controlled by first rounding mode bit field 22, and in concurrence, the floating-point operation in floating-point unit slice 1 is controlled by second rounding mode bit field 23.

Note that extending FPSCR 21 to accommodate one rounding mode field per slice comes at virtually no cost. Usually a FPSCR has many unused (reserved) bits, and each rounding mode field occupies only two of the unused bits.

Figure 3:
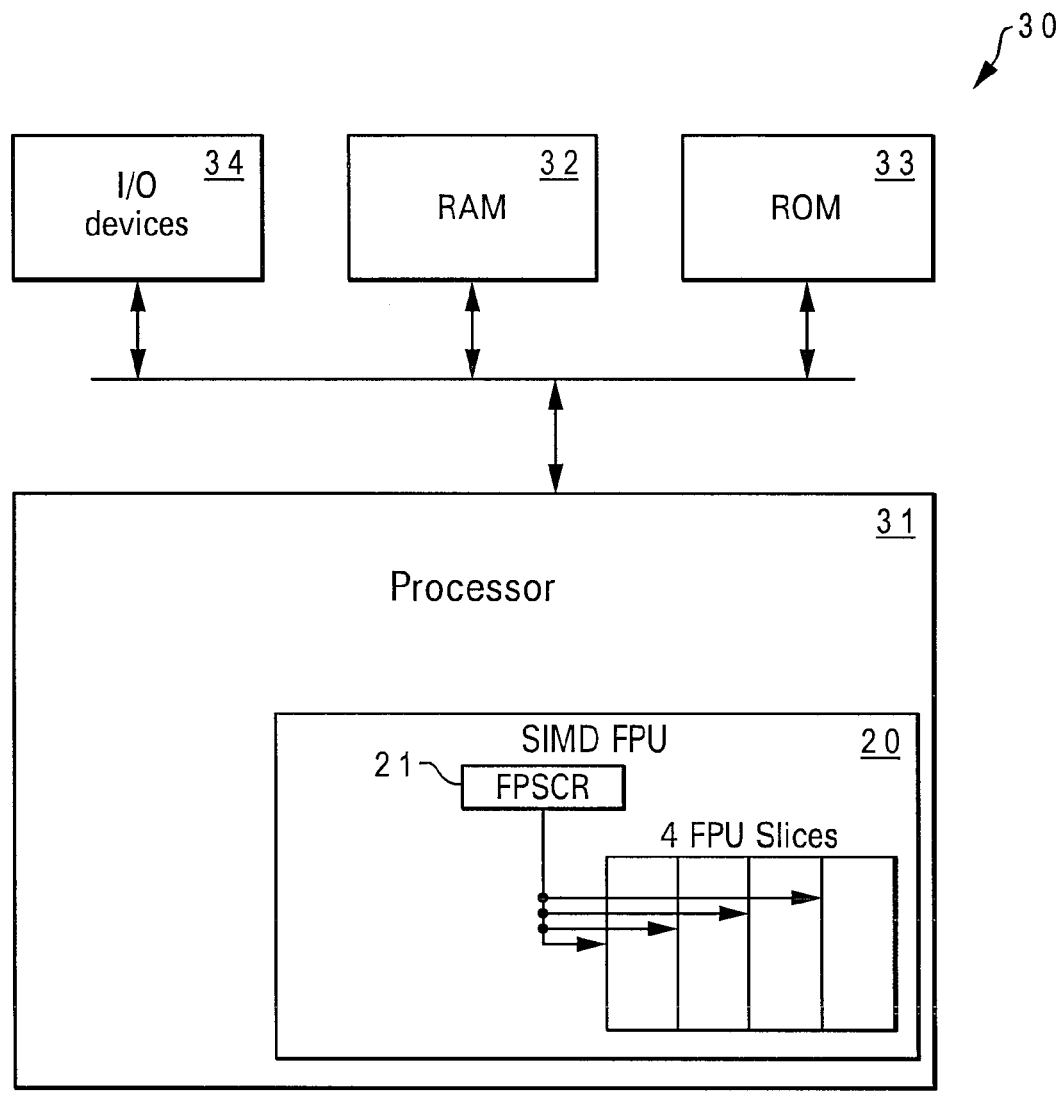
FIG. 3 is a block diagram of a SIMD system, in which a preferred embodiment of the present invention can be incorporated.

Referring now to FIG. 3, there is illustrated a block diagram of a SIMD data processing system, in which a preferred embodiment of the present invention can be incorporated. As shown, a SIMD data processing system 30 includes a SIMD processor 31, a random access memory (RAM) 32, a read-only memory (ROM) 33 and multiple input/output devices 34, all connected to a system bus 35. SIMD processor 31 includes SIMD floating-point unit 20 that is controlled by other parts of SIMD processor 31. For example, SIMD floating-point unit 20 receives an instruction and data stream from a processor core. SIMD floating-point unit 20 also includes FPSCR 21 for controlling the executing mode of multiple execution unit slices. In FIG. 3, four floating-point unit slices are shown to be controlled by the mode bit fields in FPSCR 21. Since there are four floating-point unit slices, four modes, each in its mode field within FPSCR 21 are used to control the four floating-point unit slices separately.

As has been described, the present invention provides an apparatus for controlling rounding modes for a SIMD floating-point unit. Although the present invention is illustrated by a SIMD floating-point unit with two slices, it is understood by those skilled in the art that the principle of the present invention can be extended to a SIMD floating-point unit having any number of slices or other kind of SIMD units. Also, even though a rounding mode bit field is used to illustrate the present invention, the mode bit field may contain any type of mode operations for the SIMD floating-point unit.

With the present invention, interval arithmetic can be performed on a SIMD unit by performing the round-up and round-down operations concurrently on different slices of the SIMD floating-point unit. This makes most, if not all, rounding mode switching unnecessary. As a result, the performance of the SIMD floating-point unit can be significantly improved. In addition, other complex mathematical computations that have to switch the rounding mode on a regular basis can also benefit from a SIMD floating-point unit where the slices may operate with different rounding modes.

It is also important to note that although the present invention has been described in the context of a fully functional SIMD data processing system, those skilled in the art will appreciate that the mechanisms of the present invention are capable of being distributed as a computer program product in a variety of forms.

While the invention has been particularly shown and described with reference to a preferred embodiment, it will be understood by those skilled in the art that various changes in form and detail may be made therein without departing from the spirit and scope of the invention.

What is claimed is:

1. A method for controlling an operation mode in a single instruction multiple data (SIMD) unit, said method comprising:
   providing a first floating-point unit slice and a second floating-point unit slice in a SIMD unit;
   controlling said first and second floating-point unit slices by a floating-point status- and control register having a first rounding mode bit field and a second rounding mode bit field; and
   performing a round-up operation on said first floating-point unit slice according to a bit in said first rounding mode bit field in concurrence with performing a round-down operation on said second floating-point unit slice according to a bit in said second rounding mode bit field.

2. The method of claim 1, wherein said SIMD unit is a SIMD floating-point unit.

3. A computer readable medium having a computer program product for controlling an operation mode in a single instruction multiple data (SIMD) unit, said computer readable medium comprising:
   computer program code for providing a first floating-point unit slice and a second floating-point unit slice in a SIMD unit;
   computer program code for controlling said first and second floating-point unit slices by a floating-point status- and control register having a first rounding mode bit field and a second rounding mode bit field; and
   computer program code for performing a round-up operation on said first floating-point unit slice according to a bit in said first rounding mode bit field in concurrence with performing a round-down operation on said second floating-point unit slice according to a bit in said second rounding mode bit field.

4. The computer readable medium of claim 3, wherein said SIMD unit is a SIMD floating-point unit.

* * * * *